United States Patent
Niculescu-Mizil et al.

(10) Patent No.: US 11,120,127 B2
(45) Date of Patent: Sep. 14, 2021

(54) RECONSTRUCTION-BASED ANOMALY DETECTION

(71) Applicant: NEC Laboratories America, Inc., Princeton, NJ (US)

(72) Inventors: Alexandru Niculescu-Mizil, Plainsboro, NJ (US); Eric Cosatto, Red Bank, NJ (US); Xavier Fontaine, Paris (FR)

(73) Assignee: NEC Corporation

( * ) Notice: Subject to any disclaimer, the term of this patent is extended or adjusted under 35 U.S.C. 154(b) by 281 days.

(21) Appl. No.: 16/218,976

(22) Filed: Dec. 13, 2018

(65) Prior Publication Data

US 2019/0197236 A1 Jun. 27, 2019

Related U.S. Application Data

(60) Provisional application No. 62/610,612, filed on Dec. 27, 2017.

(51) Int. Cl.
| | |
|---|---|
| *G06F 21/55* | (2013.01) |
| *H04L 29/06* | (2006.01) |
| *G06K 9/62* | (2006.01) |
| *G06N 5/00* | (2006.01) |
| *G06N 3/02* | (2006.01) |

(52) U.S. Cl.
CPC .......... *G06F 21/552* (2013.01); *G06F 21/554* (2013.01); *G06K 9/6256* (2013.01); *G06N 3/02* (2013.01); *G06N 5/003* (2013.01); *H04L 63/1425* (2013.01); *H04L 63/1441* (2013.01); *G06F 2221/034* (2013.01)

(58) Field of Classification Search
CPC ............. G06F 21/552; G06F 21/554; G06F 2221/034; G06K 9/6256; G06N 3/02; G06N 5/003; H04L 63/1425; H04L 63/1441

See application file for complete search history.

(56) References Cited

U.S. PATENT DOCUMENTS

| | | | |
|---|---|---|---|
| 9,038,178 B1 * | 5/2015 | Lin | H04L 63/02 726/23 |
| 9,112,895 B1 * | 8/2015 | Lin | H04L 63/1425 |
| 10,372,120 B2 * | 8/2019 | Patil | G05B 23/0243 |
| 10,593,033 B2 * | 3/2020 | Niculescu-Mizil | G16H 20/30 |
| 10,824,535 B1 * | 11/2020 | Shah | G06F 11/0766 |
| 2014/0279779 A1 * | 9/2014 | Zou | G06N 3/049 706/25 |
| 2014/0372348 A1 | 12/2014 | Lehmann et al. | |
| 2016/0330225 A1 | 11/2016 | Kroyzer et al. | |

(Continued)

OTHER PUBLICATIONS

Vladimir Vovk et al., "Testing Exchangeability Online", ICML Aug. 2003.

(Continued)

*Primary Examiner* — Hee K Song
(74) *Attorney, Agent, or Firm* — Joseph Kolodka

(57) ABSTRACT

Methods and systems for detecting and correcting anomalies include predicting normal behavior of a monitored system based on training data that includes only sensor data collected during normal behavior of the monitored system. The predicted normal behavior is compared to recent sensor data to determine that the monitored system is behaving abnormally. A corrective action is performed responsive to the abnormal behavior to correct the abnormal behavior.

18 Claims, 4 Drawing Sheets

(56) References Cited

U.S. PATENT DOCUMENTS

| | | | | |
|---|---|---|---|---|
| 2016/0350173 | A1* | 12/2016 | Ahad | G06F 11/3072 |
| 2017/0024649 | A1* | 1/2017 | Yan | G06N 3/0454 |
| 2017/0126709 | A1* | 5/2017 | Baradaran | H04L 63/1416 |
| 2017/0206464 | A1 | 7/2017 | Clayton et al. | |
| 2018/0007074 | A1* | 1/2018 | Kune | G06F 1/28 |
| 2018/0083996 | A1* | 3/2018 | Hodjat | H04L 63/1425 |
| 2018/0176241 | A1* | 6/2018 | Manadhata | G06F 16/2477 |
| 2018/0219889 | A1* | 8/2018 | Oliner | G06N 3/08 |
| 2018/0374569 | A1* | 12/2018 | Niculescu-Mizil | G06T 7/001 |
| 2019/0089599 | A1* | 3/2019 | Savalle | H04L 67/34 |
| 2019/0124099 | A1* | 4/2019 | Matselyukh | G06F 21/566 |
| 2019/0138938 | A1* | 5/2019 | Vasseur | G06N 5/003 |
| 2020/0183953 | A1* | 6/2020 | Bhan | G06F 16/285 |

OTHER PUBLICATIONS

Valentina Fedorova et al., "Plug-in martingales for testing exchangeability on-line", ICML Jun. 2012.
Shen-Shyang Ho et al., "A Martingale Framework for Detecting Changes in Data Streams by Testing Exchangeability," Pattern Analysis and Machine Intelligence, IEEE Transactions, Dec. 2010.
Robert B. Cleveland et al., STL: A Seasonal-Trend Decomposition Procedure Based on Loess Journal of Official Statistics, Jan. 1990.

\* cited by examiner

RECONSTRUCTION-BASED ANOMALY DETECTION

RELATED APPLICATION INFORMATION

This application claims priority to U.S. Provisional Patent Application No. 62/610,612, filed on Dec. 27, 2017, incorporated herein by reference herein its entirety.

BACKGROUND

Technical Field

The present invention relates to anomaly detection and, more particularly, to anomaly detection in physical, sensor-based systems.

Description of the Related Art

Anomaly detection attempts to identify aberrant operation of a system. However, existing approaches to anomaly detection are based on the use of previously-identified anomalous behavior as training data. This limits the speed with which an anomaly detection system can be deployed and furthermore limits its applicability in systems that fail only rarely, such that little information is available regarding anomalous behavior.

SUMMARY

A method for detecting and correcting anomalies includes predicting normal behavior of a monitored system based on training data that includes only sensor data collected during normal behavior of the monitored system. The predicted normal behavior is compared to recent sensor data to determine that the monitored system is behaving abnormally. A corrective action is performed responsive to the abnormal behavior to correct the abnormal behavior.

A system for detecting and correcting anomalies includes a machine learning model configured to predict normal behavior of a monitored system based on training data that includes only sensor data collected during normal behavior of the monitored system. An anomaly module includes a processor configured to compare the predicted normal behavior to recent sensor data to determine that the monitored system is behaving abnormally. A control module is configured to perform a corrective action responsive to the abnormal behavior to correct the abnormal behavior.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide anomaly detection without the use of training data from known-anomalous behavior. The present embodiments instead use training data that represents known-normal system behavior to predict normal system behavior. Behavior that deviates from the predicted normal behavior is regarded as anomalous.

Figure 1:
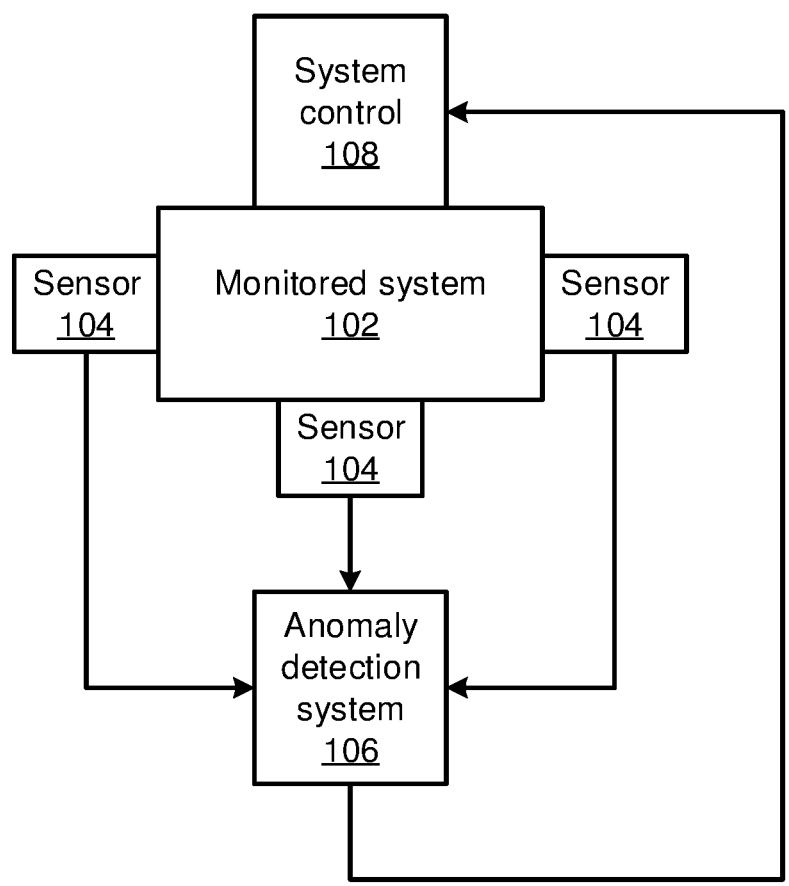
FIG. 1 is a block diagram of a monitoring system that collects sensor information from a monitored system and detects anomalous behavior of the monitored system by comparing the sensor information to predicted normal behavior in accordance with an embodiment of the present invention.

Referring now to FIG. 1, an anomaly detection system 106 in the context of a monitored system 102. The monitored system 102 can be any appropriate system, including physical systems such as manufacturing lines and physical plant operations, electronic systems such as computers or other computerized devices, and software systems such as operating systems and applications.

One or more sensors 104 record information about the state of the monitored system 102. The sensors 104 can be any appropriate type of sensor including, for example, physical sensors, such as temperature, humidity, vibration, pressure, voltage, current, magnetic field, electrical field, and light sensors, and software sensors, such as logging utilities installed on a computer system to record information regarding the state and behavior of the operating system and applications running on the computer system. The information generated by the sensors 104 can be in any appropriate format and can include sensor log information generated with heterogeneous formats.

The sensors 104 may transmit the logged sensor information to an anomaly detection system 106 by any appropriate communications medium and protocol, including wireless and wired communications. The anomaly detection system 106 predicts the behavior of the monitored system 102 and compares the actual behavior, measured by the sensors 104, to the predicted behavior. If the actual behavior of the monitored system 102 deviates from the predicted behavior by more than a threshold amount, the anomaly detection system 106 identifies the behavior as being anomalous.

Once anomalous behavior has been detected, the anomaly detection system 106 communicates with a system control unit 108 to alter one or more parameters of the monitored system 102 to correct the anomalous behavior. Exemplary corrective actions include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. The anomaly detection system 106 thereby automatically corrects or mitigates the anomalous behavior.

By providing anomaly detection for systems that are new, or for which anomalous behavior is uncommon or has not been previously recorded, the present embodiments provide a substantial improvement in the operation of the monitored system and thus represent a significant improvement in the technical fields of anomaly detection and automated system management. The present embodiments include fewer false alarms and more true detections of abnormal behavior than other types of anomaly detection. In addition, the present embodiments detect all anomalies, including those that have not been encountered before.

Figure 2:
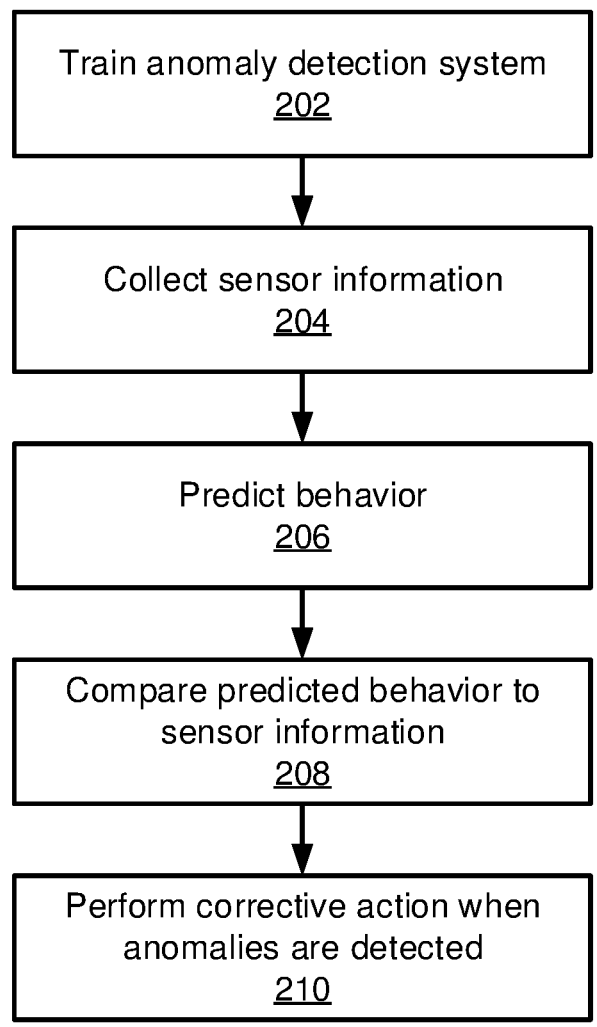
FIG. 2 is a block/flow diagram of a method for detecting and correcting anomalous behavior of the monitored system in accordance with an embodiment of the present invention.

Referring now to FIG. 2, a method for anomaly detection and correction is shown. Block 202 trains the anomaly detection system 202 using known-normal sensor information that is collected when the monitored system 102 is behaving normally. Block 204 then collects new sensor information regarding the present behavior of the monitored system 104.

Block 206 predicts the present behavior of the monitored system using the trained anomaly detection system 202. This represents expected behavior and sets the baseline for determining whether the actual behavior is normal or abnormal. Block 208 then compares the measured sensor information that characterizes the actual system behavior against the predicted behavior. If the actual behavior of the monitored system 102 deviates from the predicted behavior by more than a threshold value, then an anomaly has been discovered and block 210 performs a corrective action.

In one particular embodiment, block 208 can compare actual sensor values to expected sensor values to obtain an anomaly map. The anomaly map may, for example, characterize deviations as a percentage of the expected sensor values. Large deviations on the anomaly map are designated as true anomalies, while lesser values can be designated as "no anomaly" or "possible anomaly," depending on whether the anomaly value exceeds respective thresholds.

It is specifically contemplated that the anomaly detection system 106 may include a machine learning model. Any appropriate machine learning model may be employed, but it in some embodiments the machine learning model may be implemented as an autoencoder, which includes an encoder and a decoder arranged in serial. An input of time-series of sensor measurements is given to the encoder, which reduces the input to an N-dimensional vector, where N is smaller than the dimensionality of the input. The decoder then uses the N-dimensional vector to reconstruct a time-series of sensor measurements. The autoencoder model is then trained using backpropagation with the objective to reconstruct the input, using a loss function that reflects the difference between the input sensor measurements and the reconstructed sensor measurements.

Because the dimensionality of the embedded space is smaller than the dimensionality of the input, the autoencoder cannot learn an identity function. Instead, the autoencoder model effectively compresses the input into the embedded N-dimensional space and then decompresses that input, thereby learning underlying structural elements that are present in the training set.

To further encourage the autoencoder to learn the real structure of the data, parts of the input maybe masked, while the autoencoder has to regenerate those target parts. For example, the last quarter part of a time-series may be generated using the first quarter part as input. Alternatively, the center half of the input maybe masked and the job of the autoencoder is to regenerate that part using the first and last quarters. The masking may be accomplished by setting the values to zero, or simply by ignoring them (i.e. not using them as input to the autoencoder).

Any type of trainable model can be used to implement the autoencoder. For example, neural-networks can be used, in particular deep neural-network models using stacks of convolutional blocks. Convolutional blocks typically include a normalization layer, a multi-kernel convolutional layer, a regularization layer, a subsampling layer, and a squashing function. Appropriate loss function maybe used to obtain an error measure of a reconstructed sample. For example, the average of the squared differences between the target and the generated vectors can be used as a loss function. More advanced loss functions may incorporate domain-specific heuristics. Any type of optimization procedure can be used to train the autoencoder. For example, a stochastic gradient descent (SGD) maybe be used. Alternatively, momentum methods may be used.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
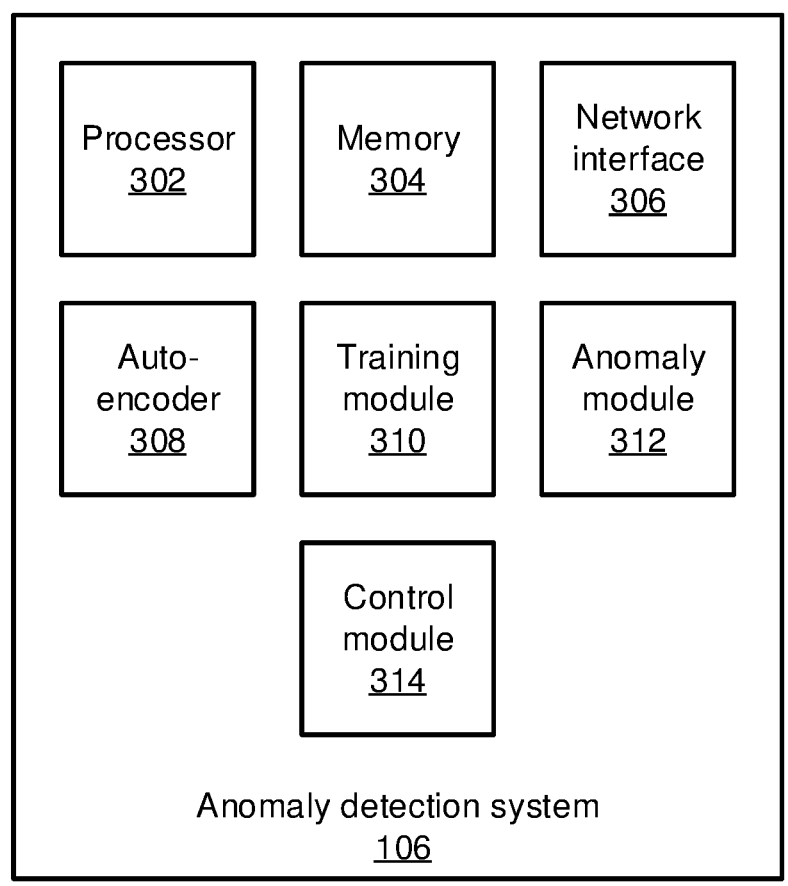
FIG. 3 is a block diagram of an anomaly detection system that detects and corrects anomalous behavior of the monitored system in accordance with an embodiment of the present invention.

Referring now to FIG. 3, additional detail on the anomaly detection system 106 is shown. The anomaly detection system 106 includes a hardware processor 302, a memory 304, and a network interface 306. The network interface 306 communicates with the sensors 104 and the system control 108 by any appropriate wired or wireless communications medium and using any appropriate protocol. The anomaly detection system 106 further includes one or more functional modules that may, in some embodiments, be implemented as software that is stored in memory 304 and executed by hardware processor 302. In other embodiments, one or more of the functional modules may be implemented as one or more discrete hardware components in the form of, e.g., application-specific integrated chips or field programmable gate arrays.

An autoencoder 308 is implemented using an appropriate machine learning system. In some exemplary embodiments, the autoencoder 308 may be implemented as a neural network that may, in turn, be implemented as software that is executed by the hardware processor 302. A training module 310 trains the autoencoder model 308 using a set of training data, for example including a set of sensor measurements taken when the monitored system 102 is known to be operating correctly.

An anomaly module 312 generates predictions of the behavior of the monitored system 102 using the trained autoencoder model 308. The anomaly module 312 then compares actual sensor information from the sensors 104 and compares the actual sensor information to the predicted behavior of the monitored system 102. The anomaly module 312 flags any deviations between the actual sensor information and the predicted behavior that are greater than a threshold value as an anomaly. The control module 314 automatically responds to flagged anomalies by sending instructions to the system control 108 using the network interface 306.

Figure 4:
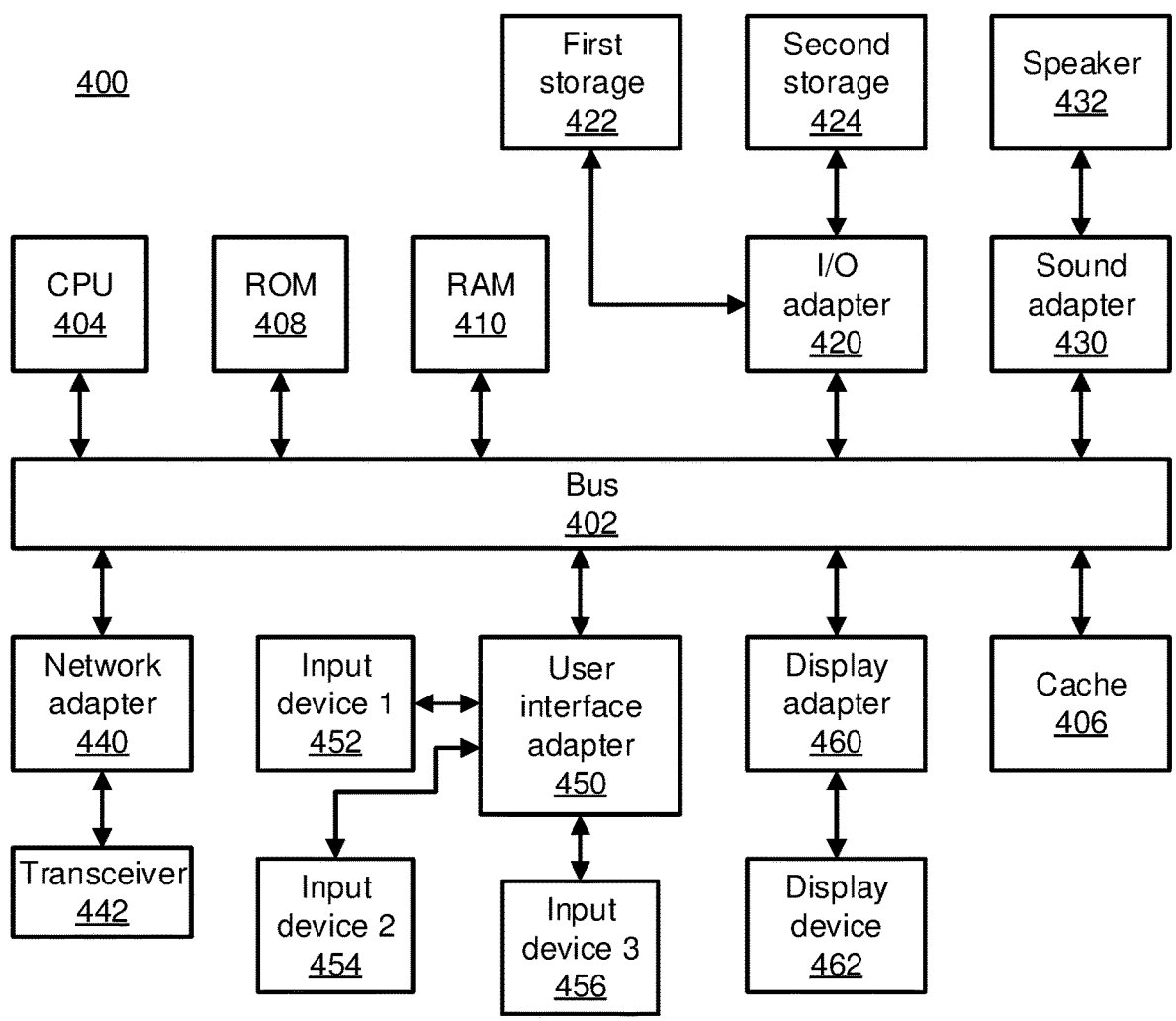
FIG. 4 is a block diagram of a processing system in accordance with an embodiment of the present invention.

Referring now to FIG. 4, an exemplary processing system 400 is shown which may represent the anomaly detection system 106. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting and correcting anomalies, comprising:
   predicting normal behavior of a monitored system based on training data that includes only sensor data collected during normal behavior of the monitored system, by generating time-series data that represents the predicted normal behavior of the monitored system using an autoencoder model trained with the training data;
   receiving time-series data that represents recent sensor measurements;
   comparing the time-series data representing the predicted normal behavior to the time-series data representing the recent sensor data to determine that the monitored system is behaving abnormally; and
   performing a corrective action responsive to the abnormal behavior to correct the abnormal behavior.

2. The method of claim 1, wherein the autoencoder model is a neural network autoencoder and comprises an encoder part and a decoder part.

3. The method of claim 2, wherein the encoder part has an input and an output, where a dimensionality of the encoder's output is lower than a dimensionality of the encoder's input.

4. The method of claim 1, wherein predicting normal behavior comprises masking part of the training data and reconstructing the masked part.

5. The method of claim 4, wherein masking part of the training data comprises removing values from time series that make up the training data.

6. The method of claim 1, wherein comparing comprises comparing the recent sensor data to the predicted normal behavior using a comparison function and determining that a comparison result value is above a threshold.

7. The method of claim 6, wherein comparing comprises determining a mean of squared vector differences between the predicted normal behavior and the recent sensor data.

8. The method of claim 6, wherein the comparison function is based on domain-specific heuristics.

9. The method of claim 1, wherein the corrective action is selected from the group consisting of changing a security setting for an application or hardware component of the monitored system, changing an operational parameter of an application or hardware component of the monitored system, halting or restarting an application of the monitored system, halting or rebooting a hardware component of the monitored system, changing an environmental condition of the monitored system, and changing status of a network interface of the monitored system.

10. A system for detecting and correcting anomalies, comprising:
- a machine learning model that includes an autoencoder model trained with training data that includes only sensor data collected during normal behavior of the monitored system, configured to predict normal behavior of a monitored system with output time-series data that represents the predicted normal behavior of the monitored system;
- an anomaly module comprising a processor configured to compare the predicted normal behavior to recent sensor data to determine that the monitored system is behaving abnormally; and
- a control module configured to perform a corrective action responsive to the abnormal behavior to correct the abnormal behavior.

11. The system of claim 10, wherein the autoencoder model is a neural network autoencoder and comprises an encoder part and a decoder part.

12. The system of claim 11, wherein the encoder part has an input and an output, where a dimensionality of the encoder's output is lower than a dimensionality of the encoder's input.

13. The system of claim 10, wherein the machine learning model is further configured to mask part of the training data and to reconstruct the masked part.

14. The system of claim 13, wherein the machine learning model is further configured to remove values from time series that make up the training data to mask part of the training data.

15. The system of claim 10, wherein the anomaly module is further configured to compare the recent sensor data to the predicted normal behavior using a comparison function and to determine that a comparison result value is above a threshold.

16. The system of claim 15, wherein the anomaly module is further configured to determine a mean of squared vector differences between the predicted normal behavior and the recent sensor data.

17. The system of claim 15, wherein the comparison function is based on domain-specific heuristics.

18. The system of claim 10, wherein the corrective action is selected from the group consisting of changing a security setting for an application or hardware component of the monitored system, changing an operational parameter of an application or hardware component of the monitored system, halting or restarting an application of the monitored system, halting or rebooting a hardware component of the monitored system, changing an environmental condition of the monitored system, and changing status of a network interface of the monitored system.

* * * * *